Patented Jan. 25, 1938

2,106,317

UNITED STATES PATENT OFFICE 2,106,317

PROCESS OF CHANGING THE COLOR OF NATURAL STONE

Edwin M. Dezendorf, Austin, Tex.

No Drawing. Application October 19, 1936, Serial No. 106,452

4 Claims. (Cl. 41—41)

This invention relates to a process of changing the color of natural stone and has for an object to provide terrazzo aggregate of several shades of pink and red by a heat treatment of natural stone or marble of cream or yellow tints.

In carrying out the invention the process is extended to utilizing stone containing iron, manganese, and the like and of a natural yellow cream, or different shades of yellow color.

I have discovered by subjecting rock of this character and color to heat, the iron, manganese, or other mineral deposits therein, is changed from a yellow color to various shades of red or pink. In practice it has been found that flame should not touch the rock and also that best results are obtained by heating the rock in an atmosphere deficient in oxygen and then at the end of the heating treatment supplying atmospheric air and immediately wetting the hot stone with water.

In a specific example of manufacturing terrazzo aggregate from natural stone or marble, the stone is heated in a furnace, after having been comminuted into the proper size. The terrazzo aggregate is preferably subjected to heat of not more than 900 degrees F. or less than 600 degrees F. Preferably the material is heat treated in an atmosphere deficient in oxygen. Also at the end of the heat treating period, which is continued to a period of several hours, until the marble or stone becomes a desired color, atmospheric air is suddenly admitted by throwing open the door of the furnace. The hot stone is then wet with water.

In another embodiment of the invention the process may be carried out as above described with the exception that the heat treating and other steps of the process may be performed before the stone or marble has been crushed into terrazzo chips or terrazzo aggregate and then crushing the product into the proper sizes after the desired color has been imparted thereto.

In a further modification of the invention the stone or marble, either crushed to the desired sizes to form terrazzo aggregate, or before crushing, may be heat treated outside of the furnace by covering the rock with wood and maintaining the degree of heat to not more than 900 degrees F.

From the above description it is thought that the process comprising the present invention will be easily understood without further explanation.

What is claimed is:

1. A process of manufacturing terrazzo aggregate from natural stone or marble consisting of heating the stone or marble in natural sizes or comminuted form until the cream or yellow tints of the stone or marble are changed to desired shades of pink and red.

2. A process of manufacturing terrazzo aggregate from stone of cream or yellow shades, consisting of applying heat thereto within a range of 600 degrees F. to 900 degrees F. for a time period of several hours until the desired shade of red or pink has appeared in the product.

3. The process of manufacturing terrazzo aggregate from natural stone or marble consisting of subjecting the same to an atmosphere deficient in oxygen at a temperature of from 600 degrees F. to 900 degrees F., maintaining the heat treatment during a period of several hours, admitting atmospheric air, and wetting the hot stone with water.

4. A process of changing the color of stone which comprises supporting a stone to be colored so that heat may be applied from all directions, applying heat to the stone so supported and discontinuing heating upon attainment of the desired color.

EDWIN M. DEZENDORF.